US012795587B2

(12) United States Patent
Keshavamurthy et al.

(10) Patent No.: US 12,795,587 B2
(45) Date of Patent: Nov. 10, 2026

(54) SIDELINK POSITIONING

(71) Applicant: Nokia Technologies Oy, Espoo (FI)

(72) Inventors: Prajwal Keshavamurthy, Munich (DE); Stepan Kucera, Munich (DE); Diomidis Michalopoulos, Munich (DE); Anastasios Kakkavas, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 336 days.

(21) Appl. No.: 18/435,457

(22) Filed: Feb. 7, 2024

(65) Prior Publication Data

US 2024/0284379 A1 Aug. 22, 2024

(30) Foreign Application Priority Data

Feb. 17, 2023 (GB) ..................................... 2302239

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC ............................. H04W 64/00; H04L 5/0051
See application file for complete search history.

(56) References Cited

U.S. PATENT DOCUMENTS

2022/0110088 A1* 4/2022 Bao ........................ H04B 17/24
2023/0125160 A1* 4/2023 Sirotkin ................ H04W 64/00 455/456.1
2023/0208580 A1* 6/2023 Li ......................... G01S 5/0205 370/329
2023/0224848 A1* 7/2023 Dong ...................... H04W 4/02 455/456.1

FOREIGN PATENT DOCUMENTS

EP 3198897 B1 1/2022
WO 2022/246628 A1 12/2022
WO 2023/282914 A1 1/2023

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 6 pages.

(Continued)

*Primary Examiner* — Myron Wyche
(74) *Attorney, Agent, or Firm* — BURR & FORMAN LLP

(57) ABSTRACT

Example embodiments of the present disclosure relate to sidelink positioning. In an example method, a terminal device detects a positioning reference signal (PRS) from a second terminal device and location information transmission associated with the PRS in case the location information was transmitted. The terminal device determines that the PRS is transmitted without location information of the second terminal device. The terminal device transmits, to a network device, indication information for indicating the PRS transmitted without the location information of the second terminal device. Sidelink positioning performance can be improved.

19 Claims, 8 Drawing Sheets

(56) References Cited

OTHER PUBLICATIONS

"3rd Generation Partnership Project; Technical Specification Group Radio Access Network; Study on Expanded and Improved NR Positioning; (Release 18)", 3GPP TR 38.859, V18.0.0, Dec. 2022, pp. 1-238.
"New WID on Expanded and Improved NR Positioning", 3GPP TSG RAN Meeting #98-e, RP-223549, Agenda: 9.1.1, Intel Corporation, Dec. 12-16, 2022, pp. 1-7.
"3rd Generation Partnership Project; Technical Specification Group Radio Access Network; Study on scenarios and requirements of in-coverage, partial coverage, and out-of-coverage NR positioning use cases (Release 17)", 3GPP TR 38.845, V17.0.0, Sep. 2021, pp. 1-16.
"3rd Generation Partnership Project; Technical Specification Group Services and System Aspects; Service requirements for the 5G system; Stage 1 (Release 19)", 3GPP TS 22.261, V19.1.0, Dec. 2022, 115 pages.
"LS reply to 3GPP RAN on requirements of in-coverage, partial coverage, and out-ofcoverage positioning use cases", 3GPP TSG RAN Meeting #91e, RP-210040, 5GAA, Jan. 25-30, 2021, pp. 1-5.
"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.
"Discussion of session-based and session-less sidelink positioning", 3GPP TSG-RAN WG2 Meeting #120, R2-2212109, Agenda: 8.2.2, Nokia, Nov. 14-18, 2022, 4 pages.
"Study of Sidelink Positioning Architecture, Signaling and Procedures", 3GPP TSG RAN WG2 Meeting #120, R2-2212857, Agenda: 8.2.2, Qualcomm Incorporated, Nov. 14-18, 2022, pp. 1-26.
"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"Protocol considerations for sidelink positioning", 3GPP TSG-RAN WG2 Meeting #120, R2-2212941, Agenda: 8.2.2, Philips International B.V., Nov. 14-18, 2022, 6 pages.
"Text Proposals of TR 38.859 for Expanded and Improved NR Positioning", 3GPP TSG RAN WG2 Meeting #120, R2-2213325, Agenda: 8.2.1, CATT, Nov. 14-18, 2022, pp. 1-8.
"Summary of [AT119bis-e][424][POS] SLPP/RSPP protocol design (Qualcomm)", 3GPP TSG-RAN WG2 #119bis-e, R2-xxxxxxx, Agenda: 8.2.2, Qualcomm Incorporated, Oct. 10-19, 2022, pp. 1-13.
"IEEE 802.11 ", Wikipedia, Retrieved on Mar. 13, 2024, Webpage available at : https://en.wikipedia.org/wiki/IEEE_802. 11.
Search Report received for corresponding United Kingdom Patent Application No. 2302239.5, dated Aug. 18, 2023, 2 pages.
"Discussion on Sidelink Positioning", 3GPP RAN WG2 Meeting #119-bis-e, R2-2209693, Agenda: 8.2.2, InterDigital Inc., Oct. 10-19, 2022, 15 pages.
Extended European Search Report received for corresponding European Patent Application No. 24156676.9, dated Jul. 25, 2024, 8 pages.

* cited by examiner

SIDELINK POSITIONING

FIELD

Example embodiments of the present disclosure generally relate to the field of telecommunication, and in particular, to devices, methods, apparatuses and a computer readable storage medium for sidelink positioning.

BACKGROUND

With the development of communication technology, sidelink (SL) positioning has been introduced to improve positioning efficiency and accuracy. SL positioning is based on transmissions of sidelink positioning reference signal (SL PRS) by multiple anchor user equipments (UE) to be received by a target UE in e.g. SL time difference of arrival (TDOA) methods or SL PRS exchange between the anchor UE(s) and target UEs in e.g. SL (multi-) round-trip time (RTT) method. SL positioning enables localization of the target UE and/or ranging of target UE with respect to a reference UE (e.g. anchor UE) within precise latency and accuracy requirements of the corresponding SL positioning.

Solutions for SL positioning are studied as part of 3GPP Release-18 study item "Study on expanded and improved new radio (NR) positioning" (FS_NR_pos_enh2) [RP-213588] which target to support use cases such as vehicle-to-everything (V2X), public safety, commercial and industrial-internet-of-things (IIoT). TR 38.859 captures the outcome of the study. Subsequently, work item on "Expanded and Improved NR Positioning" (NR_pos_enh2) [RP-223549] is approved in RAN #98, which includes SL positioning as a key objective. However, there is a need to enhance SL positioning to improve system performance and accuracy.

SUMMARY

In general, example embodiments of the present disclosure provide a solution for sidelink positioning.

In a first aspect, there is provided a first terminal device. The first terminal device comprises at least one processor and at least one memory storing instructions that, when executed by the at least one processor, cause the first terminal device at least to: detect a positioning reference signal (PRS) from a second terminal device and location information transmission associated with the PRS in case the location information was transmitted; determine that the PRS is transmitted without location information of the second terminal device; and transmit, to a network device, indication information for indicating the PRS transmitted without the location information of the second terminal device.

In a second aspect, there is provided a network device. The network device comprises at least one processor and at least one memory storing instructions that, when executed by the at least one processor, cause the network device at least to: receive, from a first terminal device, indication information for indicating a positioning reference signal (PRS) transmitted by a second terminal device without location information of the second terminal device; determine whether to trigger the second terminal device to transmit the location information of the second terminal device along with a subsequent PRS; and based on determining to trigger the second terminal device, transmit, to the second terminal device, trigger information for triggering the second terminal device to transmit the location information along with the subsequent PRS.

In a third aspect, there is provided a second terminal device. The second terminal device comprises at least one processor and at least one memory storing instructions that, when executed by the at least one processor, cause the second terminal device at least to: transmit a positioning reference signal (PRS) without location information of the second terminal device; receive, from a network device, trigger information for triggering the second terminal device to transmit the location information of the second terminal device along with a subsequent PRS; and based on receiving the trigger information, transmit the subsequent PRS along with the location information of the second terminal device.

In a fourth aspect, there is provided a method. The method comprises receiving, at a first terminal device, a positioning reference signal (PRS) from a second terminal device; determining that the PRS is transmitted without location information of the second terminal device; and transmitting, to a network device, indication information for indicating the PRS transmitted without the location information of the second terminal device.

In a fifth aspect, there is provided a method. The method comprises receiving, at a network device from a first terminal device, indication information for indicating a positioning reference signal (PRS) transmitted by a second terminal device without location information of the second terminal device; determining whether to trigger the second terminal device to transmit the location information of the second terminal device along with a subsequent PRS; and based on determining to trigger the second terminal device, transmitting, to the second terminal device, trigger information for triggering the second terminal device to transmit the location information along with the subsequent PRS.

In a sixth aspect, there is provided a method. The method comprises transmitting, at a second terminal device, a positioning reference signal (PRS) without location information of the second terminal device; receiving, from a network device, trigger information for triggering the second terminal device to transmit the location information of the second terminal device along with a subsequent PRS; and based on receiving the trigger information, transmitting the subsequent PRS along with the location information of the second terminal device.

In a seventh aspect, there is provided an apparatus comprising means for receiving, at a first terminal device, a positioning reference signal (PRS) from a second terminal device; means for determining that the PRS is transmitted without location information of the second terminal device; and means for transmitting, to a network device, indication information for indicating the PRS transmitted without the location information of the second terminal device.

In an eighth aspect, there is provided an apparatus comprising means for receiving, at a network device from a first terminal device, indication information for indicating a positioning reference signal (PRS) transmitted by a second terminal device without location information of the second terminal device; means for determining whether to trigger the second terminal device to transmit the location information of the second terminal device along with a subsequent PRS; and means for based on determining to trigger the second terminal device, transmitting, to the second terminal device, trigger information for triggering the second terminal device to transmit the location information along with the subsequent PRS.

In a ninth aspect, there is provided an apparatus comprising means for transmitting, at a second terminal device, a positioning reference signal (PRS) without location information of the second terminal device; means for receiving, from a network device, trigger information for triggering the second terminal device to transmit the location information of the second terminal device along with a subsequent PRS; and means for based on receiving the trigger information, transmitting the subsequent PRS along with the location information of the second terminal device.

In a tenth aspect, there is provided a non-transitory computer readable medium comprising program instructions for causing an apparatus to perform at least the method according to any one of the above fourth to sixth aspect.

In an eleventh aspect, there is provided a computer program comprising instructions, which, when executed by an apparatus, cause the apparatus at least to perform at least the method according to any one of the above fourth to sixth aspect.

In a twelfth aspect, there is provided a first terminal device. The first terminal device comprises detecting circuitry configured to detect a positioning reference signal (PRS) from a second terminal device and location information transmission associated with the PRS in case the location information was transmitted; determining circuitry configured to determine that the PRS is transmitted without location information of the second terminal device; and transmitting circuitry configured to transmit, to a network device, indication information for indicating the PRS transmitted without the location information of the second terminal device.

In a thirteenth aspect, there is provided a network device. The network device comprises receiving circuitry configured to receive, from a first terminal device, indication information for indicating a positioning reference signal (PRS) transmitted by a second terminal device without location information of the second terminal device; determining circuitry configured to determine whether to trigger the second terminal device to transmit the location information of the second terminal device along with a subsequent PRS; and transmitting circuitry configured to base on determining to trigger the second terminal device, transmit, to the second terminal device, trigger information for triggering the second terminal device to transmit the location information along with the subsequent PRS.

In a fourteenth aspect, there is provided a second terminal device. The second terminal device comprises transmitting circuitry configured to transmit a positioning reference signal (PRS) without location information of the second terminal device; receiving circuitry configured to receive, from a network device, trigger information for triggering the second terminal device to transmit the location information of the second terminal device along with a subsequent PRS; and transmitting circuitry configured to base on receiving the trigger information, transmit the subsequent PRS along with the location information of the second terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
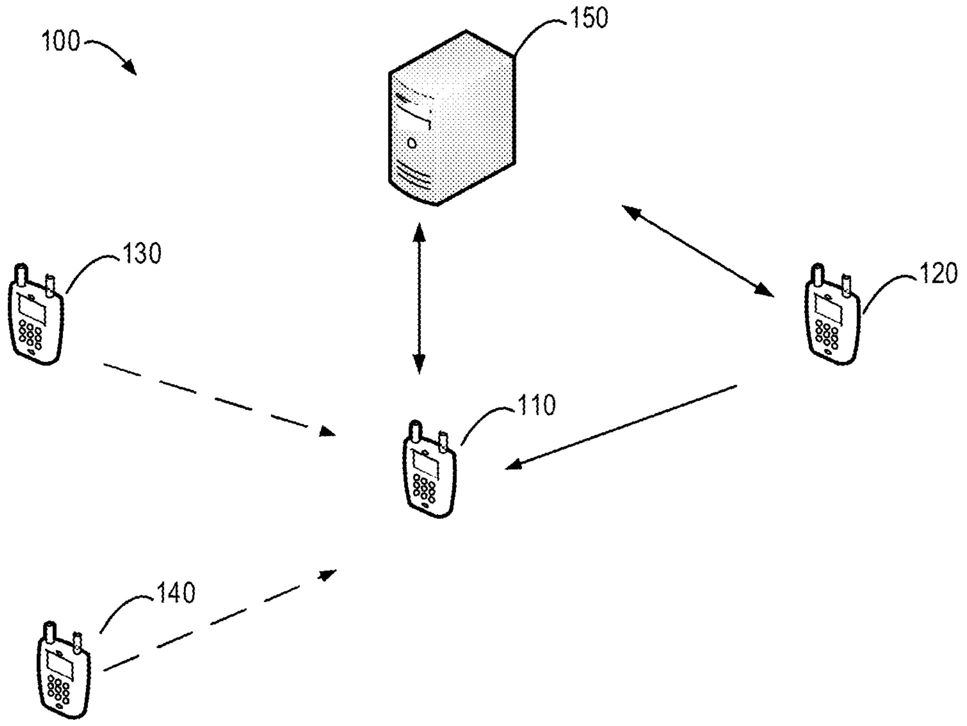
FIG. 1 illustrates an example of a network environment in which some example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

3GPP RAN conducted a study on "Scenarios and requirements of in-coverage, partial coverage, and out-of-coverage NR positioning use cases" in Release-17 focused on V2X and public safety use cases with the outcome being captured in TR38.845. Additionally, SA1 has developed requirements in TS22.261 for "Ranging based services", and has developed positioning accuracy requirements in TS22.104 for IIoT use cases in out-of-coverage scenarios. Furthermore, the positioning requirements are captured via key-performance-indices (KPIs) such as:

(a) horizontal and vertical accuracy, where vertical accuracy refers to accuracy in altitude and determines the floor for indoor use cases and to distinguish between superposed tracks for road and rail use cases (e.g. bridges);

(b) positioning service availability, percentage value of the amount of time the positioning service is delivering the required position-related data within the performance requirements, divided by the amount of time the system is expected to deliver the positioning service according to the specification in the targeted service area [TS 22.261];

(c) positioning service latency: time elapsed between the event that triggers the determination of the position-related data and the availability of the position-related data at the system interface [TS 22.261].

(d) time to first fix (TTFF): time elapsed between the event triggering for the first time the determination of the position-related data and the availability of the position-related data at the positioning system interface [TS 22.261];

(e) Update rate;

(f) Energy consumption, etc.

In Table 7.3.2.2-1, TS22.261 lists the performance requirements for different positioning service levels. It is noted that, along with horizontal and vertical accuracy requirements, the requirements on positioning service availability and positioning service latency are particularly very stringent for positioning service levels 4 (99.9% availability and 15 ms latency) and 6 (99.9% availability and 10 ms latency). The examples of scenarios/use cases of positioning service levels 4 and 6 include:

(a) V2X, set-2 and set-3 use cases [TR 38.845]: This corresponds to, in RP-210040, 'Group 2: Lane level positioning requirement' use cases such as vehicle platooning, cooperative lane merge, lane change warning, emergency break warning, intersection movement assist, etc., and 'Group 3: Below meter positioning requirement' use cases such as high definition sensor sharing, vulnerable road user (VUR)-collision risk warning, cooperative manoeuvers in emergency situations, real-time situation awareness and high-definition maps, etc.;

(b) IIoT [TS 22.104]: Factories of the Future scenarios such as augmented reality in smart factories, mobile control panels with safety functions in smart factories (within factory danger zones), inbound logistics for manufacturing (for driving trajectories (if supported by further sensors like camera, GNSS, IMU) of indoor autonomous driving systems)).

As used herein, the term "ranging" refers to determining the distance and/or the direction between a UE and another entity, e.g., anchor UE.

As used herein, the term "sidelink positioning reference signal (SL PRS)" refers to reference signal transmitted over SL for positioning purposes.

As used herein, the term "SL PRS (pre-) configuration" refers to (Pre-) configured parameters of SL PRS such as time-frequency resources (other parameters are not precluded) including its bandwidth and periodicity.

SL positioning is based on the transmissions of SL PRS by multiple anchor UEs to be received by a target UE in e.g. SL time difference of arrival (TDOA) methods OR SL PRS exchange between the anchor(s) and target UEs in e.g. SL (multi-) RTT method to enable localization of the target UE and/or ranging of target UE with respect to a reference UE (e.g. anchor UE) within precise latency and accuracy requirements of the corresponding SL positioning.

As used herein, the term "session-based SL positioning" refers to conventional approach where the location estimate is obtained by a "time-limited two-way link enabling interactive expression and information exchange between two or more communication devices, typically in presence of state (i.e. information about session history)." \.

On the other side, the key characteristic of "session-less SL positioning" is the absence of anchor UE discovery procedure, as well as no specific anchor UE association and no SL positioning protocol (SLPP) session.

SL positioning is defined as positioning of a target UE using SL PRS (reference signals transmitted over SL, i.e., PC5 interface) to obtain absolute position, relative position, or ranging information. Hence, an anchor UE may be transmitting SL PRS to assist the target UE in either absolute positioning, relative positioning or ranging. Accordingly, the absolute locations (referred as location for short henceforth) of the anchor UEs are needed only in case of absolute positioning of the target UE, and hence only those anchor UEs which are involved in absolute positioning of the target UE may transmit their location information along with the SL PRS transmission. On the other hand, the anchor UEs involved in relative positioning or ranging may transmit only SL PRS without their location information along with the SL PRS. In addition, in case of network-based (UE-assisted) SL absolute positioning where the Location Management Function (LMF) computes the location of the target UE based on SL PRS measurements provided by the target UE, the anchor UEs may not transmit their location information on SL.

There can be a SL positioning scenario where a target UE needs to perform absolute positioning in a session-less manner, and at least some of the anchor UEs in the vicinity are involved in relative positioning or ranging i.e. transmitting only SL PRS without their associated location information. In this scenario, not all the SL PRS received by the target UE are useful in its absolute positioning because some of the SL PRS (i.e. SL PRS associated with ranging and relative positioning) do not have the associated location information of the anchor UEs, even if the reception qualities of those SL PRS are good.

Hence, there may be insufficient number of SL PRS to support absolute positioning of a session-less target UE. This may reduce positioning accuracy of the session-less target UE. In addition, SL PRS resource utilization is reduced since such SL PRS cannot be used by session-less target UEs. On the other hand, each anchor UE which is aware of its own location and involved in ranging or relative positioning blindly transmitting location information along with SL PRS may not be resource efficient since there may not be session-less target UEs in the vicinity that can benefit from the additional location information.

There is no mechanism that allows a target UE to request from network that location information of other peer UEs is provided on SL in addition to SL PRS, for the target UE's positioning purposes.

In view of the above, example embodiments of the present disclosure provide a solution for sidelink positioning. Especially, the example embodiments of the present disclosure can improve SL positioning performance (e.g., accuracy) of session-less target UEs by increasing the availability of SL PRS that has associated anchor location information. In addition, the example embodiments of the present disclosure can increase utilization of SL PRS involved in ranging and/or relative positioning since, in addition to their intended use in ranging and/or relative positioning, those SL PRS can also be used at the session-less target UEs for absolute positioning. Besides, SL positioning is a key technology for many use cases including public safety, V2X, and industrial IoT. Principles and some example embodiments of the present disclosure will be described in detail below with reference to the accompanying drawings.

FIG. 1 illustrates an example of a network environment 100 in which some example embodiments of the present disclosure may be implemented. In the descriptions of the example embodiments of the present disclosure, the network environment 100 may also be referred to as a communication system 100 (for example, a portion of a communication network). For illustrative purposes only, various aspects of example embodiments will be described in the context of network devices and terminal devices that communicate with one another. It should be appreciated, however, that the description herein may be applicable to other types of apparatus or other similar apparatuses that are referenced using other terminology.

As illustrated in FIG. 1, the communication system 100 may comprise a terminal device 110 (hereinafter may also be referred to as UE 110 or a target UE 110), a terminal device 120 (hereinafter may also be referred to as UE 120 or a second terminal device 120), a terminal device 130 (hereinafter may also be referred to as UE 130 or a anchor UE 130), and a terminal device 140 (hereinafter may also be referred to as UE 140 or a anchor UE 140). Links from the terminal device 110 to the terminal devices 120-140 are referred to as a sidelink (SL). The terminal device 110 can communicate with the terminal devices 120-140 via the SL.

The sidelink interface may alternatively be referred to as a ProSe interface, device-to-device (D2D) interface, or a PC5 interface or reference point. In some example embodiments, the network environment 100 may be deployed within a vehicular communication system. In a vehicular communication system, the terminal device 110 may communicate with one another using cellular vehicle-to-everything (V2X) communications. V2X may involve vehicle-to-vehicle (V2V), vehicle-to-infrastructure (V2I), vehicle-to-network (VTN), or vehicle-to-pedestrian (V2P) communications.

Alternatively, or in addition, the first terminal device 110 can be defined as the UE to be positioned. For example, in this disclosure, the first terminal device 110 can be positioned by using SL (PC5 interface).

Alternatively, or in addition, the terminal devices 120-140 can be defined as the UE supporting positioning of first terminal device 110. For example, terminal devices 120-140 can support positioning of first terminal device 110 by transmitting and/or receiving reference signals for positioning, providing positioning-related information, etc., over the SL interface.

The communication system 100 may further comprise a network device 150 (hereinafter may also be referred to as LMF 150). The network devices 150 in the communication system 100 provide one or more services (for example, network connectivity) for one or more terminal devices 110-140 that may be installed within or that may roam throughout an associated geographical area. Therefore, terminal devices 110-140 can communicate with the network device 150.

In some embodiments, first terminal device 110 performs SL positioning by receiving SL PRS from three terminal devices 120-140 and determines its location using SL TDOA method. Accordingly, the terminal devices 120-140 may provide SL PRS assistance (including SL PRS) to the first terminal device 110. Furthermore, in in-coverage scenarios, the network devices 150 may coordinate the SL positioning where the SL PRS transmissions from terminal devices 120-140 may be configured by the network device 150.

It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more network devices and terminal devices may be located in the environment 100.

Communications in the network environment 100 may be implemented according to any proper communication protocol(s), comprising, but not limited to, cellular communication protocols of the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
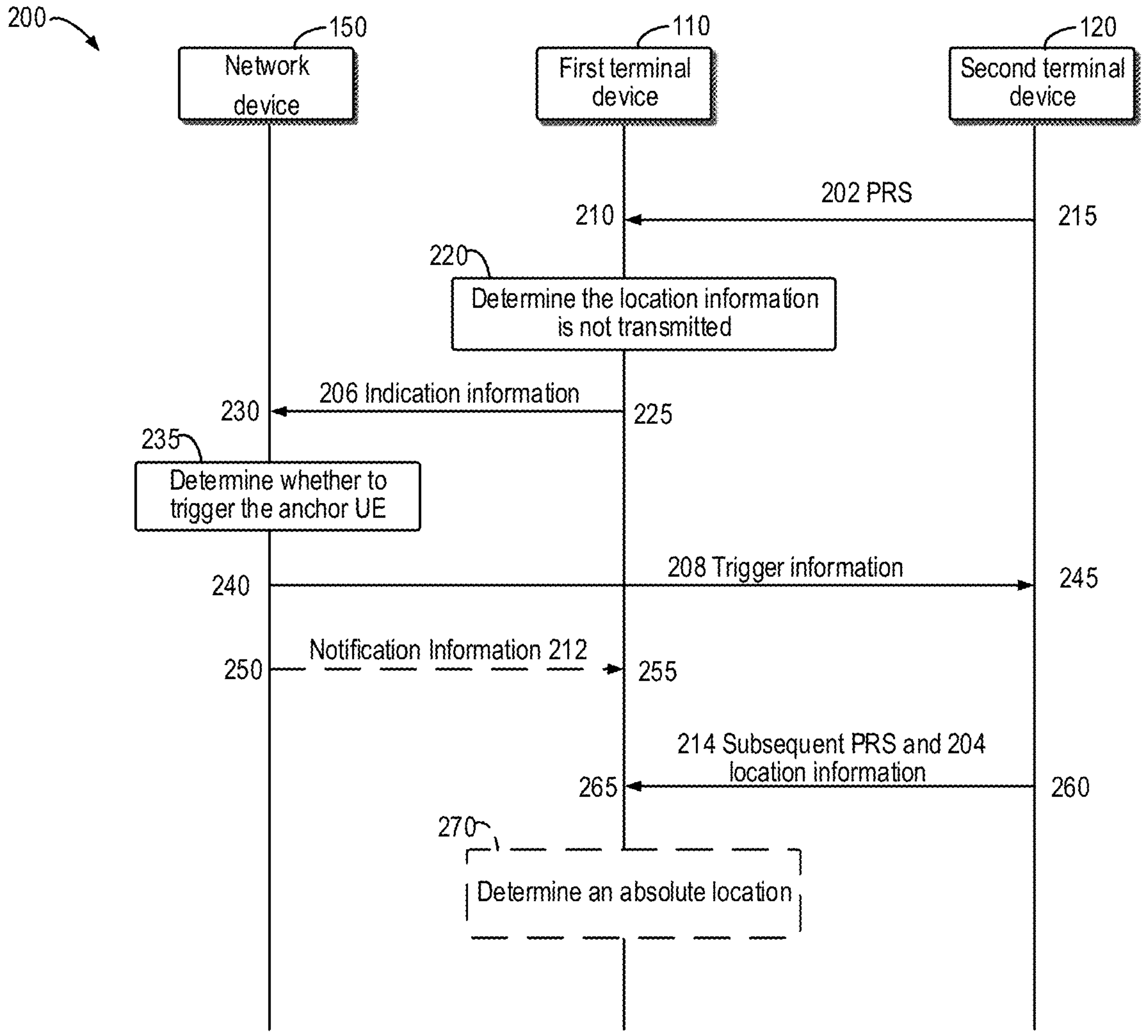
FIG. 2 illustrates an example of a process flow for transmitting a positioning reference signal with location information of an anchor UE(s) by the anchor UE(s) instructed by a Location Management Function of an operator based on a request by a target UE in accordance with some example embodiments of the present disclosure.

FIG. 2 illustrates an example of a process flow for transmitting a positioning reference signal with location information of a second terminal device 120 by the second terminal device 120 instructed by a network device 150 based on a request by a first terminal device 110 in accordance with some example embodiments of the present disclosure;

For the purpose of discussion, the process flow 200 will be described with reference to FIG. 1. It would be appreciated that although the process flow 200 has been described referring to the network environment 100 of FIG. 1, this process flow 200 may be likewise applied to other similar communication scenarios.

In the process flow 200, the first terminal device 110 detects (210) whether positioning reference signal (PRS) 202 is transmitted (215) from a second terminal device 120 and location information transmission associated with the PRS 202 in case the location information 204 was transmitted. In other words, the first terminal device 110 is configured to receive PRS 202 (such as, SL PRS) and the SL positioning data with at least location information 204, if any. The location information 204 may contain the absolute location information of the second terminal device 120. In an example, the PRS 202 (such as, SL PRS) itself does not carry the location information 204. There is a SL positioning data that is sent in association with the PRS 202 (such as, SL PRS). The first terminal device is expected to receive PRS 202 (such as, SL PRS) and also check if there is associated location information transmission.

The second terminal device 120 may not transmit anchor location information 204 along with PRS 202 because the second terminal device 120 may not be of interest to intended first terminal device 110 in ranging or relative positioning. Besides, in case of network-based (UE-assisted) SL absolute positioning, the network device 150 computes the location of first terminal device 110 based on SL PRS 202 measurements provided by the first terminal device 110, so the second terminal device 120 may not transmit the location information 204 on SL. However, utilization of SL PRS 202 that is being transmitted as part of ranging, relative positioning, and/or network-based SL absolute positioning session can be increased if anchor location, when known at the second terminal device 120, can be transmitted along with the SL PRS 202 to support third session-less first terminal device 110 in absolute positioning even though the second terminal device 120 is not of interest to its own first terminal device 110 in their ranging or relative positioning. However, always transmitting location information 204 from the second terminal device 120 is inefficient because there may not always be session-less first terminal device 110 in the vicinity.

Upon the first terminal device 110 determines (220) location information 204 of the second terminal device 120 is not transmitted along with the PRS 202, the first terminal device 110 may transmit (225) indication information 206 to the LMF 150. The indication information 206 may indicate the PRS 202 is transmitted without the location information 204 of the second terminal device 120.

In some embodiments, the indication information 206 may indicate a plurality of PRS 202 is transmitted without location information 204 of the anchor UEs, wherein the PRS 202 is one of the plurality of PRS 202. For example, the indication information 206 may indicate a plurality of PRS 202 is transmitted without location information 204 of the terminal devices 120-140.

In some embodiments, upon the first terminal device 110 determines (220) a received quality of the PRS 202 is above a threshold, the first terminal device 110 may generate the indication information 206 to indicate the PRS 202. For example, the first terminal device 110 may report only PRS 202 for which the measured Reference Signal Received Power (RSRP) is above a certain threshold.

In some embodiments, upon the first terminal device 110 determines (220) a positioning accuracy requirement of positioning of the first terminal device 110 is not satisfied using one or more available PRS 202 with associated location information 204, the first terminal device 110 may transmit the indication information 206 to the network device 150. For example, when the first terminal device 110 decides it cannot meet its positioning accuracy requirement in session-less manner using one or more available PRS 202 with associated location information 204 transmitted by the terminal devices 120-140, the first terminal device 110 may transmit the indication information 206 to the network device 150.

In some embodiments, the indication information 206 may comprise one or more of the followings: an identifier (ID) of the PRS 202, an ID of the terminal devices 120-140, a received quality of the PRS 202, a number of terminal devices 120-140 available for absolute positioning of the first terminal device 110, a positioning accuracy requirement of the positioning of the first terminal device 110, an achieved accuracy performance of the positioning of the first terminal device 110, and an ID of each anchor UR used in the absolute positioning of the first terminal device 110.

In some embodiments, the indication information 206 may be transmitted based on a long term evolution (LTE) positioning protocol (LPP) protocol.

Continuing with reference to FIG. 2, after receiving (230) the indication information 206 that indicates location information 204 of the second terminal device 120 is not transmitted along with the PRS 202 by the second terminal device 120, the network device 150 may determine (235) whether to trigger the second terminal device 120 to transmit the location information 204 of the second terminal device 120 along with a subsequent PRS 214.

In some embodiments, the indication information 206 may indicate the PRS 202 is included in a plurality of PRS 202. In order to determine whether to trigger the second terminal device 120, the network device 150 may determine to trigger a plurality of UEs transmitting the plurality of PRS 202 to transmit location information 204 of the plurality of UEs along with a subsequent plurality of PRS 202. The second terminal device 120 is included in the plurality of UEs 120-140.

In some embodiments, the indication information 206 may indicate the PRS 202 is included in a plurality of PRS 202. In order to determine whether to trigger the second terminal device 120, the network device 150 may determine a set of UEs among a plurality of UEs transmitting the plurality of PRS 202. Then the network device 150 may determine to trigger the set of UEs to transmit location information 204 of the set of UEs along with a subsequent set of PRS 202. The second terminal device 120 is included in the plurality of UEs 120-140.

In some embodiments, a set of PRS 202 transmitted by the set of terminal devices may have a received quality at the first terminal device 110 above a threshold; the set of terminal devices may enable improvement of a geometric dilution of precision (GDOP) performance at the first terminal device 110; and the set of terminal devices may have available location information 204. Then the network device 150 may determine to trigger the set of terminal devices to transmit location information 204 of the set of terminal devices along with a subsequent set of PRS 202.

In some embodiments, the network device 150 may have determined from the indication information 206 that a positioning accuracy requirement of positioning of the first terminal device 110 is not satisfied. The network device 150 may then determine to trigger the second terminal device 120.

In some embodiments, the network device 150 may have determined from the indication information 206 that a number of terminal devices 120-140 available for absolute positioning of the first terminal device 110 is below a threshold. The network device 150 may then determine to trigger the second terminal device 120.

Upon the network device 150 may have determined to trigger the second terminal device 120, the network device 150 may transmit (240) trigger information 208 to the second terminal device 120. The trigger information 208 indicates to trigger the second terminal device 120 to transmit the location information 204 along with the subsequent PRS 214.

In some embodiments, upon the network device 150 may have determined to trigger the second terminal device 120, the network device 150 may transmit (250) notification information 212 to the first terminal device 110. The notification information 212 may indicate the network device 150 triggers the second terminal device 120 to transmit the location information 204 along with the subsequent PRS 214.

In some embodiments, the first terminal device 110 may receive (255) notification information 212 from the network device 150. In some embodiments, the notification information 212 may further comprise assistance information for the first terminal device 110 to receive the location information 204 from the second terminal device 120.

On the second terminal device 120 side, the second terminal device 120 may transmit (215) PRS 202 without its location information 204 to the first terminal device 110 before receiving (245) trigger information 208.

The second terminal device 120 may receive (245) trigger information 208 from the network device 150 for triggering the second terminal device 120 to transmit the location information 204 of the second terminal device 120 along with a subsequent PRS 214.

In response to receive (245) trigger information 208, the second terminal device 120 may transmit (260) the subsequent PRS 214 along with the location information 204 of the second terminal device 120.

In some embodiments, before transmitting (260) the location information 204 and in response to the location information 204 being unavailable at the second terminal device 120, the second terminal device 120 may initiate its own absolute positioning to obtain the location information of the second terminal device 120.

In some embodiments, in response to receive (265) the subsequent PRS 214 along and the location information 204 from the second terminal device 120, the first terminal device 110 may determine (270) an absolute position of the first terminal device 110 based on the subsequent PRS 214 and the location information 204 of the second terminal device 120.

Figure 3:
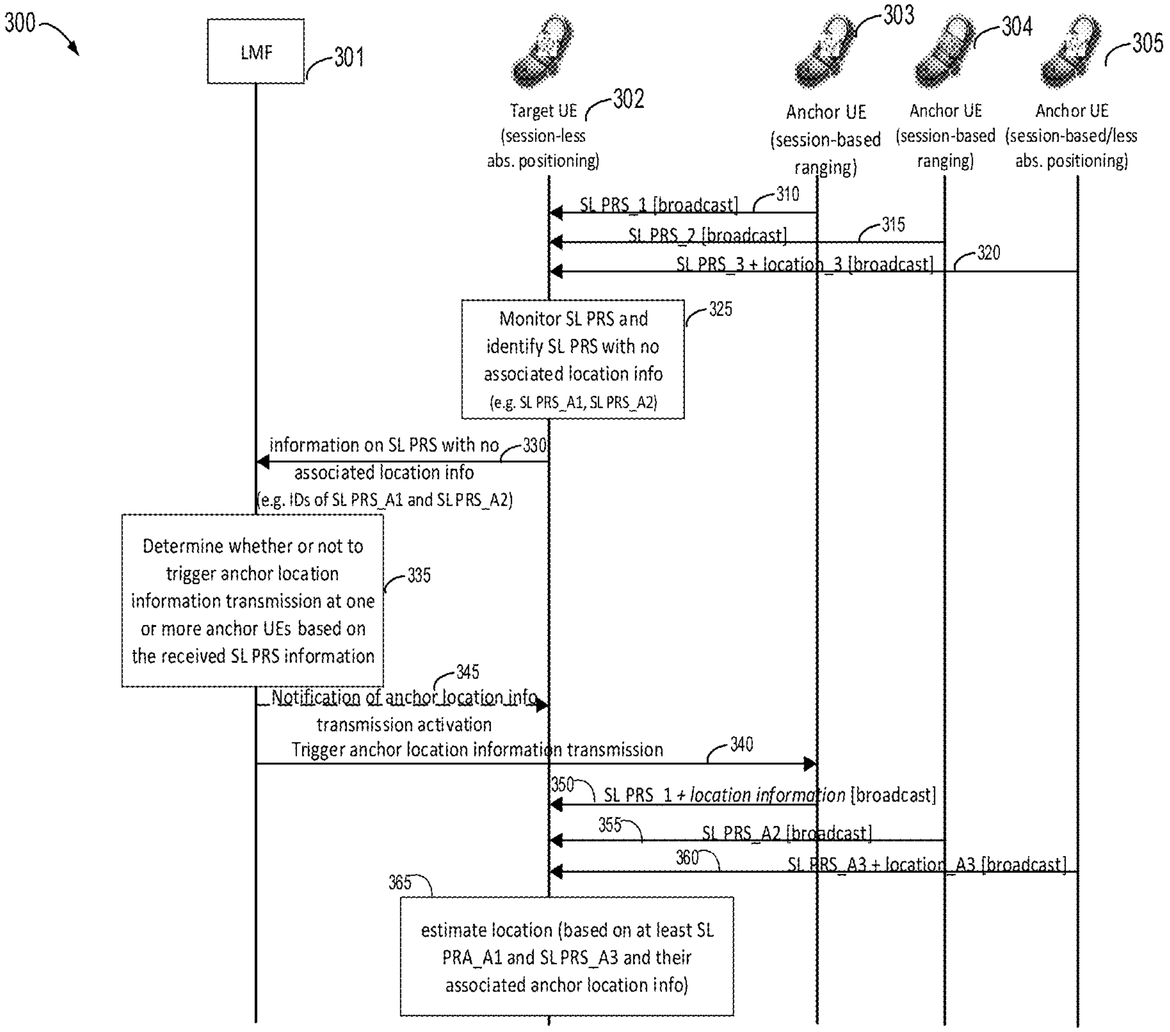
FIG. 3 illustrates a detailed example of a process flow in accordance with some example embodiments of the present disclosure.

FIG. 3 illustrates a detailed example of a process flow 300 in accordance with some example embodiments of the present disclosure. It is noted that the process flow 300 can be deemed as a further example of the process flow 200. For example, the LMF 301 may be one of the example devices of the network device 150, the target UE 302 may be one of the example devices of the first terminal device 110, and the anchor UEs 303-305 may be the example devices of the second terminal device 120. It is to be understood that these devices are described only for the purpose of illustration without suggesting any limitation as to the scope of the disclosure.

In general, a session-less target UE 302 informs the LMF 301 about SL PRS transmission(s) (or about source anchor UE(s) 303-305 of the transmission(s))) which has the potential to increase absolute positioning performance (e.g. accuracy) at the target UE 302. However, the target UE 302 currently cannot exploit that SL PRS due to missing associated anchor location information (since source anchor UE(s) 303-305 are originally intended for ranging or relative positioning). Then, the LMF 301 could trigger the corresponding anchor UE(s) 303-305 to include anchor location information along with SL PRS transmission(s) so that the session-less target UE 302 can perform SL absolute positioning with higher accuracy. This process will be described in detail as follows.

At 310, the anchor UE 303 may transmit SL PRS_1 to the target UE 302. At 315, the anchor UE 304 may transmit SL PRS_2 to the target UE 302. At 315, the anchor UE 305 may transmit SL PRS_3 with its location information_3 to the target UE 302.

In this context, the target UE 302 can be a session-less target UE which does not intend to conduct any interaction with anchor UEs in the vicinity (i.e. UE-T does not intend to be in session with any anchor UE), but detects SL PRS and the associated SL positioning data with location information transmitted from them to position itself (absolute positioning) in a session-less and UE-based (i.e. position computed at the UE) manner. The anchor UE 303 and anchor UE 304 are involved in different SL ranging (and/or relative positioning) sessions with certain (third) target UEs. As part of their respective ranging sessions, they are transmitting SL PRS. Since they are not involved in absolute positioning, they are not sending their location information along with the SL PRS transmission. On the other side, the anchor UE 305 is involved in a session-based SL absolute positioning session with the Target UE 302 and/or the anchor UE 305 supports session-less target UE 302 in the vicinity for absolute positioning. Accordingly, the anchor UE 305 may transmit its location information_3 along with its SL PRS_3.

In addition, or alternatively, the target UE 302 may receive SLPRS and associated SL positioning data (if any) from anchor UEs 303-305. For example, the target UE 302 may monitor SL PRS and SL positioning data pool to receive SL PRS and the associated SL positioning data (if any) from neighbouring anchor UEs.

At 325, the target UE 302 may monitor and identify SL PRS transmissions (or anchor UEs) that do not have the anchor location information in the associated SL positioning data (such as, PRS_1 transmitted from anchor UE 303 and PRS_2 transmitted from anchor UE 304). For example, target UE 302 may receive SL PRS from an anchor UE (with certain source ID), but it may not receive any SL positioning data from the anchor UE (with the same source ID as that of SL PRS transmission) or may not find anchor location information in the SL positioning data received from the anchor UE (with the same source ID as SL PRS transmission).

At 330, the target UE 302 may transmit indication information to the LMF 301, and indication information may indicate one or more of the detected SL PRS transmissions which do not have the associated anchor location information (such as, PRS_1 or Anchor UE 303 and PRS_2 or Anchor UE 304). For example, the target UE 302 may report SL PRS IDs of the SL PRS transmissions which do not have the associated anchor location information. In a further embodiment, the target UE 302 may report only those SL PRS for which the measured RSRP is above a certain threshold.

Alternatively or additionally, the target UE 302 may report anchor UE IDs (e.g. source IDs) of the SL PRS transmissions which do not have the associated anchor location information. In a further embodiment, the target UE 302 may report only those SL PRS for which the measured RSRP is above a certain threshold.

Alternatively or additionally, the target UE 302 may report RSRP of the SL PRS transmissions which do not have the associated anchor location information, along with their SL PRS IDs and/or anchor IDs.

Alternatively or additionally, the target UE 302 may report number of anchor UEs that are currently available for absolute positioning (i.e. number of SL PRS with associated location information and at least RSRP being above a certain threshold).

Alternatively or additionally, the target UE 302 may report its positioning accuracy requirement and currently achieved accuracy performance.

Alternatively or additionally, the target UE 302 may report anchor UE IDs (or respective SL PRS IDs) that are currently being used in its absolute positioning.

Alternatively or additionally, the target UE 302 may report to LMF 301 only when it cannot meet its positioning accuracy requirement in session-less manner using the already available anchor UEs.

Alternatively or additionally, the target UE 302 may transmit indication information to LMF 301 using LPP protocol information on one or more of the identified SL PRS transmissions which do not have the associated anchor location information.

At 335, the LMF 301 may determine where or not to trigger transmission of anchor location information from anchor UE(s) 303-305 that is transmitting the indicated SL PRS in the received information.

Alternatively or additionally, all the anchor UEs 303-305 may be determined to be triggered for anchor location information transmission.

Alternatively or additionally, among all the anchor UEs 303-305, only those anchor UEs for which the RSRP measured at the target UE 302 is above a certain threshold are determined to be triggered for anchor location information transmission.

Alternatively or additionally, among all the anchor UEs 303-305, only those anchor UEs which improve GDOP performance at the target UE 302 are determined to be triggered for anchor location information transmission.

Alternatively or additionally, LMF 301 may determine to trigger one or more of the anchor UEs 303-305 only if the target UE 302 is not able to meet its positioning accuracy requirement.

Alternatively or additionally, LMF 301 may determine to trigger one or more of the anchor UEs 303-305 only if the number of anchor UEs that are currently available at the target UE 302 for absolute positioning is below a certain threshold.

Alternatively or additionally, among all the anchor UEs 303-305, only those anchor UEs which have the location information available or can obtain the location are determined to be triggered for anchor location information transmission.

In FIG. 3 as an example, the LMF 310 may determine to trigger anchor UE 303 for anchor location information transmission.

In addition or alternatively, at 345, the LMF 345 may notify the target UE 302 on its decision to trigger one or more anchor UEs to include location information in their SL positioning data. This notification may further include assistance information to target UE 302 in receiving location information from the indicated one or more anchor UE(s).

At 340, the LMF 301 may transmit trigger information to anchor UE(s) 303-305 to trigger one or more anchor UE(s) (such as, anchor UE 303) to include anchor location information in the SL positioning data and transmit it along with its SL PRS based on the determination made at 335.

At 350, upon receiving the trigger information, the anchor UE 303 may transmit SL positioning data with anchor location information_1 along with SL PRS_1 transmission even when performing ranging and/or relative positioning. At 355, the anchor UE 304 may transmit SL PRS_2 only the target UE 302. At 360, the anchor UE 305 may transmit SL positioning data with anchor location information_3 along with SL PRS_3 transmission.

In addition or alternatively, in case of the anchor UE 303 that is not aware of its location is triggered, the anchor UE 303 may initiate its own absolute positioning to provide location information in the SL positioning data. Alternatively, for simplicity, the LMF 301 may choose to trigger only that anchor UE(s) which is already aware of its location.

At 365, the target UE 302 may estimate an absolute location in a session-less manner using at least the received SL PRS and the associated anchor location information such as, based on at least SL PRA_1 and SL PRS_3 and their associated anchor location information.

Figure 4:
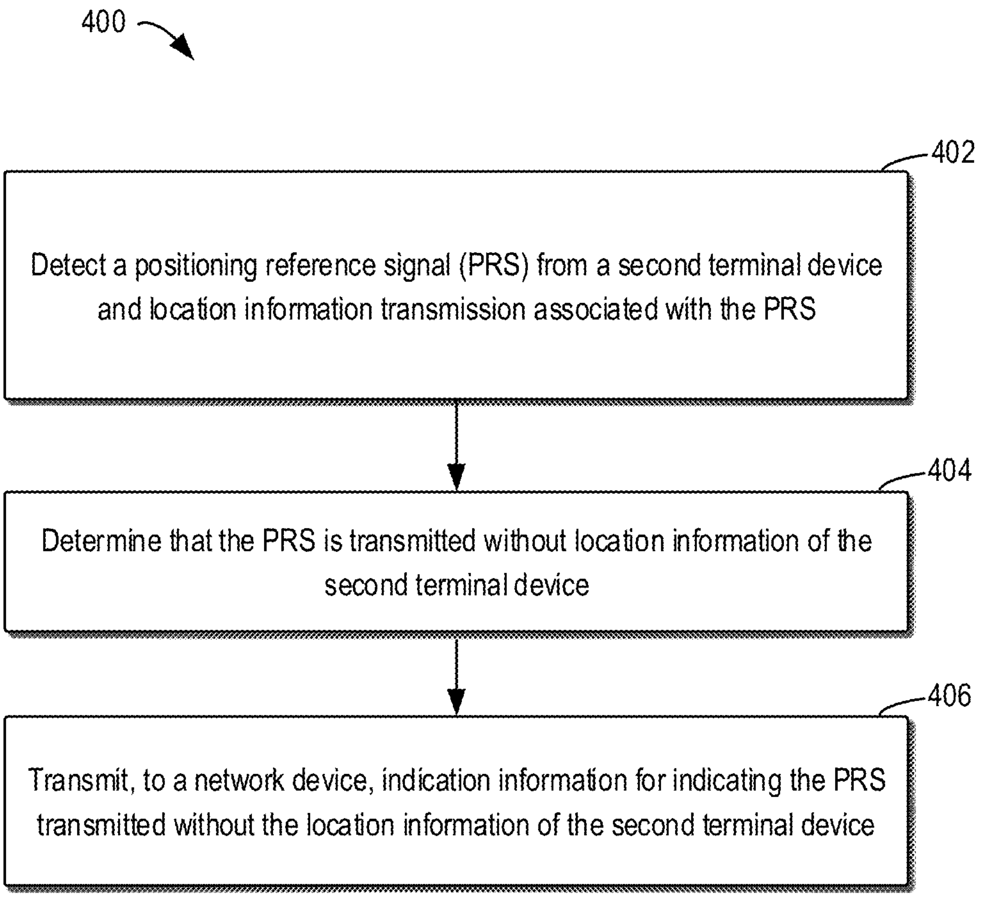
FIG. 4 illustrates a flowchart of a method implemented at a terminal device in accordance with some example embodiments of the present disclosure.

FIG. 4 illustrates a flowchart of a method 400 implemented at a terminal device in accordance with some example embodiments of the present disclosure. For the purpose of discussion, the method 400 will be described from the perspective of the terminal device 110 with reference to FIG. 1.

At block 402, the terminal device 110 detects a positioning reference signal (PRS) from a second terminal device and location information transmission associated with the PRS in case the location information was transmitted. At block 404, the terminal device 110 determines that the PRS is transmitted without location information of the second terminal device. At block 406, the terminal device 110 transmits, to a network device, indication information for indicating the PRS transmitted without the location information of the second terminal device.

In some example embodiments, the terminal device 110 may receive, from the network device, notification information that the network device triggers the second terminal device to transmit the location information along with a subsequent PRS.

In some example embodiments, the notification information may comprise assistance information for the first terminal device to receive the location information from the second terminal device.

In some example embodiments, the indication information may indicate a plurality of PRS transmitted without location information of source terminal devices, wherein the PRS is one of the plurality of PRS.

In some example embodiments, the terminal device 110 may base on determining that a received quality of the PRS is above a threshold, generate the indication information to indicate the PRS.

In some example embodiments, the terminal device 110 may transmit the indication information by based on determining that a positioning accuracy requirement of positioning of the first terminal device is not satisfied using one or more available PRS with associated location information, transmitting the indication information to the network device.

In some example embodiments, the terminal device 110 may receive, from the second terminal device, a subsequent PRS and the location information of the second terminal device and determine an absolute position of the first terminal device based on the subsequent PRS and the location information of the second terminal device.

In some example embodiments, the indication information may comprise at least one of the following: an identifier (ID) of the PRS, an ID of the second terminal device, a received quality of the PRS, a number of anchor terminal devices available for absolute positioning of the first terminal device, a positioning accuracy requirement of the positioning of the first terminal device, an achieved accuracy performance of the positioning of the first terminal device, or an ID of each anchor terminal device used in the absolute positioning of the first terminal device.

In some example embodiments, the indication information may be transmitted based on a long term evolution (LTE) positioning protocol (LPP) protocol.

Figure 5:
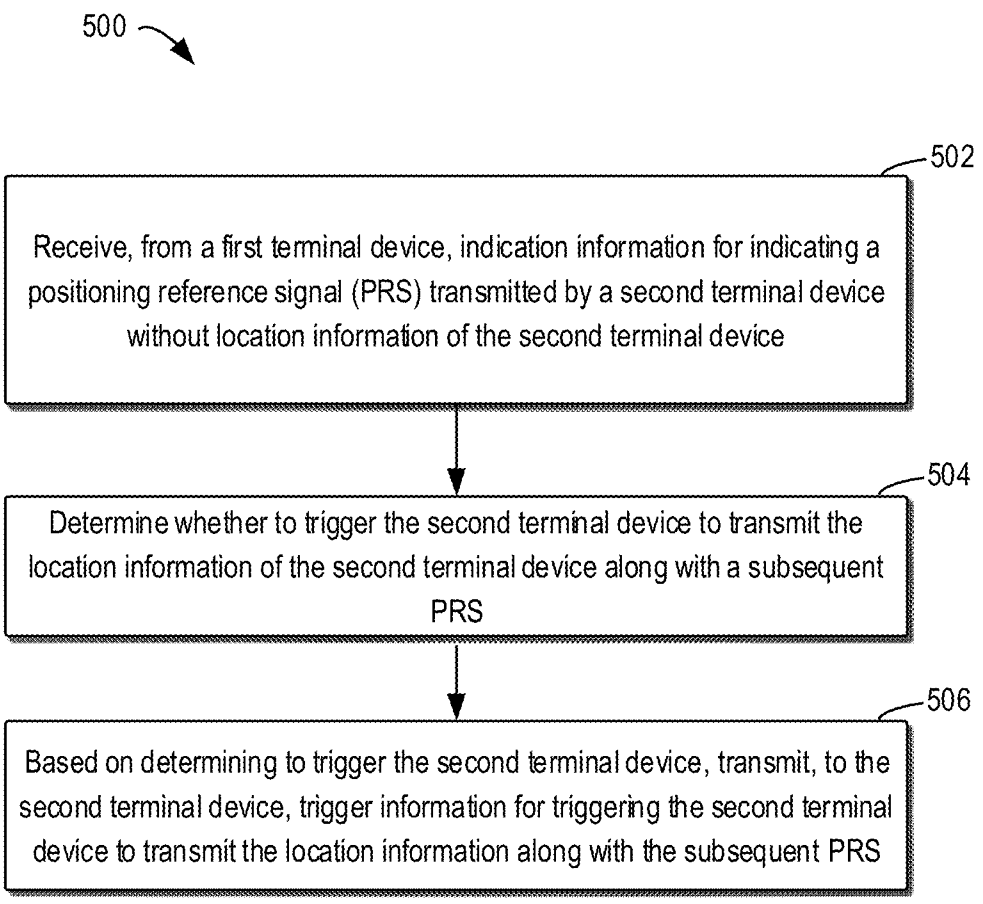
FIG. 5 illustrates a flowchart of a method implemented at a network device in accordance with some example embodiments of the present disclosure.

FIG. 5 illustrates a flowchart of a method 500 implemented at a network device in accordance with some example embodiments of the present disclosure. For the purpose of discussion, the method 500 will be described from the perspective of the network device 150 with reference to FIG. 1.

At block 502, the network device 150 receives, from a first terminal device, indication information for indicating a positioning reference signal (PRS) transmitted by a second terminal device without location information of the second terminal device. At block 504, the network device 150 determines whether to trigger the second terminal device to transmit the location information of the second terminal device along with a subsequent PRS. At block 506, the network device 150 based on determining to trigger the second terminal device, transmit, to the second terminal device, trigger information for triggering the second terminal device to transmit the location information along with the subsequent PRS.

In some example embodiments, the network device 150 may base on determining to trigger the second terminal device, transmit, to the first terminal device, notification information that the network device 150 triggers the second terminal device to transmit the location information along with the subsequent PRS.

In some example embodiments, the notification information may comprise assistance information for the first terminal device to receive the location information from the second terminal device.

In some example embodiments, the indication information may indicate a plurality of PRS including the PRS, and the network device 150 may determine whether to trigger the second terminal device by determining to trigger a plurality of terminal devices transmitting the plurality of PRS to transmit location information of the plurality of terminal devices along with a subsequent plurality of PRS, wherein the second terminal device is one of the plurality of terminal devices.

In some example embodiments, the indication information may indicate a plurality of PRS including the PRS, and the network device 150 may determine whether to trigger the second terminal device by determining a set of terminal devices among a plurality of terminal devices transmitting the plurality of PRS and determining to trigger the set of terminal devices to transmit location information of the set of terminal devices along with a subsequent set of PRS, wherein the second terminal device is one of the set of terminal devices.

In some example embodiments, a set of PRS transmitted by the set of terminal devices may have a received quality at the first terminal device above a threshold; the set of terminal devices may enable improvement of a geometric dilution of precision (GDOP) performance at the first terminal device; or the set of terminal devices may have available location information.

In some example embodiments, the network device 150 may determine whether to trigger the second terminal device by based on determining, from the indication information, that a positioning accuracy requirement of positioning of the first terminal device is not satisfied, determining to trigger the second terminal device.

In some example embodiments, the network device 150 may determine whether to trigger the second terminal device by based on determining, from the indication information, that a number of anchor terminal devices available for absolute positioning of the first terminal device is below a threshold, determining to trigger the second terminal device.

In some example embodiments, the indication information may comprise at least one of the following: an identifier (ID) of the PRS, an ID of the second terminal device, a received quality of the PRS, a number of anchor terminal devices available for absolute positioning of the first terminal device, a positioning accuracy requirement of the positioning of the first terminal device, an achieved accuracy performance of the positioning of the first terminal device, or an ID of each anchor terminal device used in the absolute positioning of the first terminal device.

In some example embodiments, the indication information is received based on a long term evolution (LTE) positioning protocol (LPP) protocol.

Figure 6:
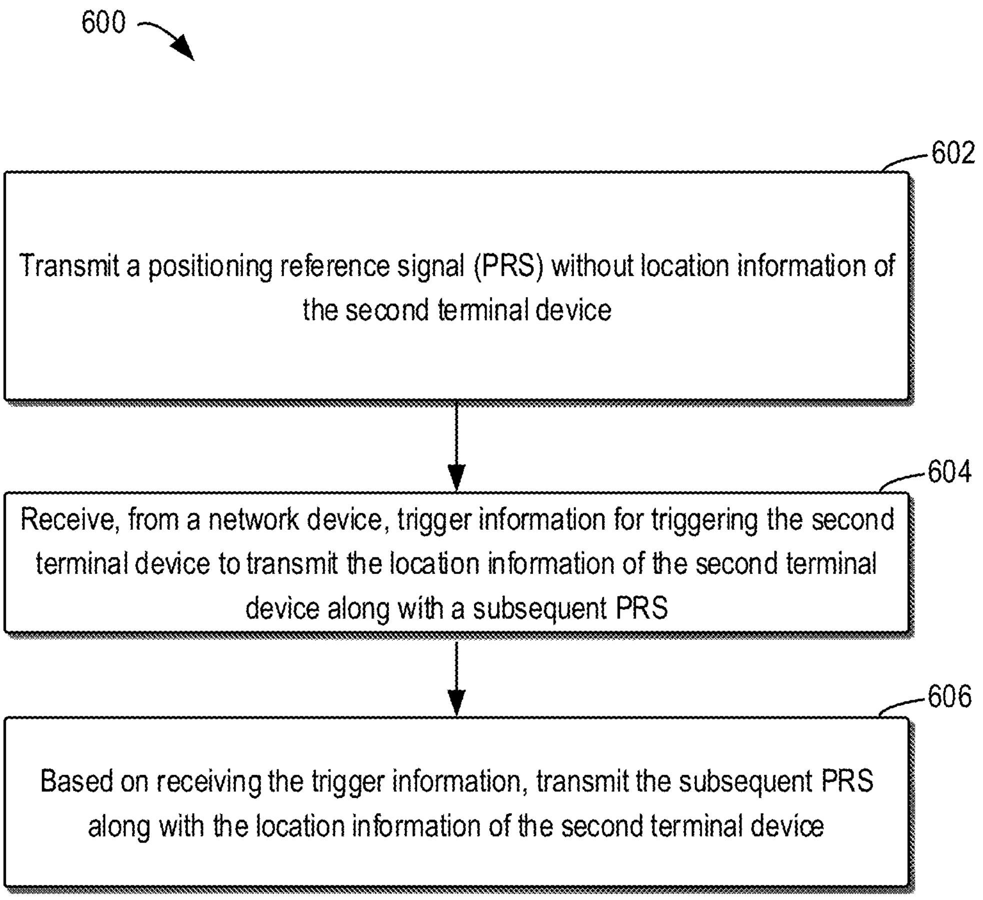
FIG. 6 illustrates a flowchart of another method implemented at a terminal device in accordance with some example embodiments of the present disclosure.

FIG. 6 illustrates a flowchart of a method 600 implemented at a terminal device in accordance with some example embodiments of the present disclosure. For the purpose of discussion, the method 600 will be described from the perspective of the terminal device 120 with reference to FIG. 1.

At block 602, the terminal device 120 transmits a positioning reference signal (PRS) without location information of the terminal device 120. At block 604, the terminal device 120 receives, from a network device, trigger information for triggering the terminal device 120 to transmit the location information of the terminal device 120 along with a subsequent PRS. At block 606, the terminal device 120 based on receiving the trigger information, transmits the subsequent PRS along with the location information of the terminal device 120.

In some example embodiments, the terminal device 120 may prior to transmitting the location information, based on determining that the location information is unavailable at the terminal device 120, initiate positioning of the terminal device 120 to obtain the location information of the terminal device 120.

In some embodiments, an apparatus capable of performing any of the method 400 (for example, the terminal device 110) may comprise means for performing the respective steps of the method 400. The means may be implemented in any suitable form. For example, the means may be implemented in a circuitry or software module.

In some embodiments, the apparatus comprises means for detecting a positioning reference signal (PRS) from a second terminal device and location information transmission associated with the PRS in case the location information was transmitted; means for determining that the PRS is transmitted without location information of the second terminal device; and means for transmitting, to a network device, indication information for indicating the PRS transmitted without the location information of the second terminal device.

In some example embodiments, the apparatus comprises means for receiving, from the network device, notification information that the network device triggers the second terminal device to transmit the location information along with a subsequent PRS.

In some example embodiments, the notification information may comprise assistance information for the first terminal device to receive the location information from the second terminal device.

In some example embodiments, the indication information may indicate a plurality of PRS transmitted without location information of source terminal devices, wherein the PRS is one of the plurality of PRS.

In some example embodiments, the apparatus comprises means for based on determining that a received quality of the PRS is above a threshold, generating the indication information to indicate the PRS.

In some example embodiments, the apparatus comprises means for transmitting the indication information by based on determining that a positioning accuracy requirement of positioning of the first terminal device is not satisfied using one or more available PRS with associated location information, transmitting the indication information to the network device.

In some example embodiments, the apparatus comprises means for receiving, from the second terminal device, a subsequent PRS and the location information of the second terminal device and determine an absolute position of the first terminal device based on the subsequent PRS and the location information of the second terminal device.

In some example embodiments, the indication information comprises at least one of the following: an identifier (ID) of the PRS, an ID of the second terminal device, a received quality of the PRS, a number of anchor terminal devices available for absolute positioning of the first terminal device, a positioning accuracy requirement of the positioning of the first terminal device, an achieved accuracy performance of the positioning of the first terminal device, or an ID of each anchor terminal device used in the absolute positioning of the first terminal device.

In some example embodiments, the indication information may be transmitted based on a long term evolution (LTE) positioning protocol (LPP) protocol.

In some embodiments, an apparatus capable of performing any of the method 500 (for example, the network device 150) may comprise means for performing the respective steps of the method 500. The means may be implemented in any suitable form. For example, the means may be implemented in a circuitry or software module.

In some embodiments, the apparatus comprises means for receiving, from a first terminal device, indication information for indicating a positioning reference signal (PRS) transmitted by a second terminal device without location information of the second terminal device; means for determining whether to trigger the second terminal device to transmit the location information of the second terminal device along with a subsequent PRS; means for based on determining to trigger the second terminal device, transmit, to the second terminal device, trigger information for triggering the second terminal device to transmit the location information along with the subsequent PRS.

In some example embodiments, the apparatus comprises means for based on determining to trigger the second terminal device, transmitting, to the first terminal device, notification information that the network device 150 triggers the second terminal device to transmit the location information along with the subsequent PRS.

In some example embodiments, the notification information may comprise assistance information for the first terminal device to receive the location information from the second terminal device.

In some example embodiments, the indication information may indicate a plurality of PRS including the PRS, and the apparatus comprises means for determining whether to trigger the second terminal device by determining to trigger a plurality of terminal devices transmitting the plurality of PRS to transmit location information of the plurality of terminal devices along with a subsequent plurality of PRS, wherein the second terminal device is one of the plurality of terminal devices.

In some example embodiments, the indication information may indicate a plurality of PRS including the PRS, and the apparatus comprises means for determining whether to trigger the second terminal device by determining a set of terminal devices among a plurality of terminal devices transmitting the plurality of PRS and determining to trigger the set of terminal devices to transmit location information of the set of terminal devices along with a subsequent set of PRS, wherein the second terminal device is one of the set of terminal devices.

In some example embodiments, a set of PRS transmitted by the set of terminal devices may have a received quality at the first terminal device above a threshold; the set of terminal devices may enable improvement of a geometric dilution of precision (GDOP) performance at the first terminal device; or the set of terminal devices may have available location information.

In some example embodiments, the apparatus comprises means for determining whether to trigger the second terminal device by based on determining, from the indication information, that a positioning accuracy requirement of positioning of the first terminal device is not satisfied, determining to trigger the second terminal device.

In some example embodiments, the apparatus comprises means for determining whether to trigger the second terminal device by based on determining, from the indication information, that a number of anchor terminal devices available for absolute positioning of the first terminal device is below a threshold, determining to trigger the second terminal device.

In some example embodiments, the indication information may comprise at least one of the following: an identifier (ID) of the PRS, an ID of the second terminal device, a received quality of the PRS, a number of anchor terminal devices available for absolute positioning of the first terminal device, a positioning accuracy requirement of the positioning of the first terminal device, an achieved accuracy performance of the positioning of the first terminal device, or an ID of each anchor terminal device used in the absolute positioning of the first terminal device.

In some example embodiments, the indication information is received based on a long term evolution (LTE) positioning protocol (LPP) protocol.

In some embodiments, an apparatus capable of performing any of the method 600 (for example, the terminal device 120) may comprise means for performing the respective steps of the method 600. The means may be implemented in any suitable form. For example, the means may be implemented in a circuitry or software module.

In some example embodiments, the apparatus comprises means for transmitting a positioning reference signal (PRS) without location information of the terminal device; means for receiving, from a network device, trigger information for triggering the terminal device 120 to transmit the location information of the terminal device 120 along with a subsequent PRS; means for based on receiving the trigger information, transmitting the subsequent PRS along with the location information of the terminal device.

In some example embodiments, the apparatus comprises means for prior to transmitting the location information, based on determining that the location information is unavailable at the terminal device 120, initiating positioning of the terminal device 120 to obtain the location information of the terminal device 120.

Figure 7:
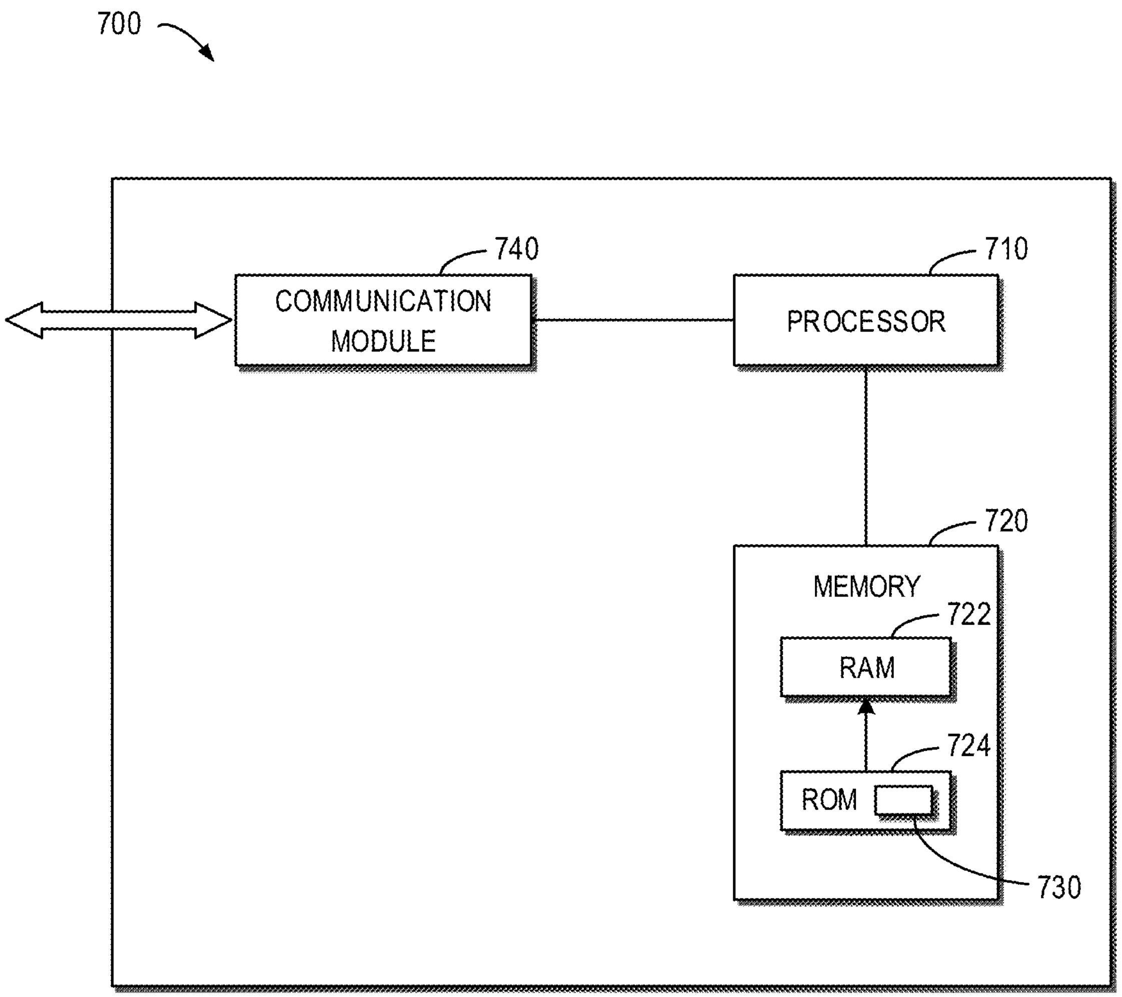
FIG. 7 illustrates a simplified block diagram of a device that is suitable for implementing some example embodiments of the present disclosure.

FIG. 7 illustrates a simplified block diagram of a device 700 that is suitable for implementing some example embodiments of the present disclosure. The device 700 may be provided to implement a communication device, for example, the terminal devices 110-140 and network device 150 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 3 to 18. The embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like.

Figure 8:
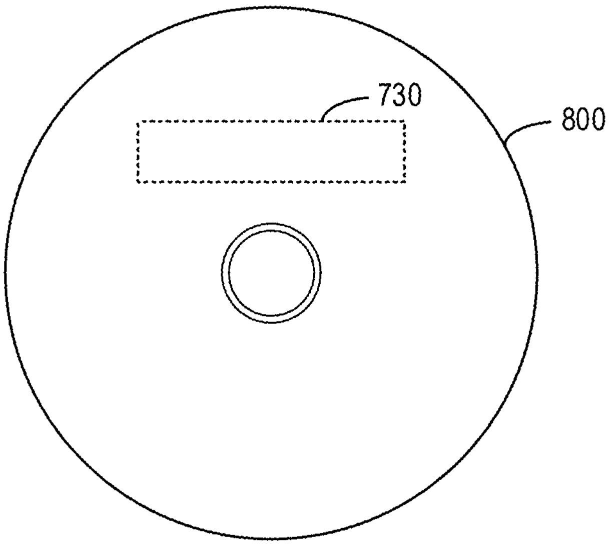
FIG. 8 illustrates a block diagram of an example of a computer readable medium in accordance with some example embodiments of the present disclosure.

FIG. 8 illustrates a block diagram of an example of a computer readable medium 800 in accordance with some example embodiments of the present disclosure. The computer readable medium 800 has the program 730 stored thereon. It is noted that although the computer readable medium 800 is depicted in form of CD or DVD in FIG. 8, the computer readable medium 800 may be in any other form suitable for carry or hold the program 1030.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400, 500 or 600 as described above with reference to FIG. 4, 5 or 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device comprising:
at least one processor; and
at least one memory storing instructions that, when executed by the at least one processor, cause the first terminal device at least to:
detect a positioning reference signal (PRS) from a second terminal device;
determine that the PRS was transmitted without location information of the second terminal device;
transmit, to a network device, indication information for indicating that the PRS transmitted without the location information of the second terminal device;
receive, from the second terminal device, a subsequent PRS and the location information of the second terminal device; and determine an absolute position of the first terminal device based on the subsequent PRS and the location information of the second terminal device.

2. The first terminal device of claim 1, wherein the first terminal device is further caused to:

receive, from the network device, notification information that the network device has triggered the second terminal device to transmit the location information along with the subsequent PRS.

3. The first terminal device of claim 2, wherein the notification information further comprises assistance information for the first terminal device to receive the location information from the second terminal device.

4. The first terminal device of claim 1, wherein the indication information indicates a plurality of PRS transmitted without location information of source terminal devices, wherein the PRS of the second terminal device is one of the plurality of PRS.

5. The first terminal device of claim 4, wherein the first terminal device is further caused to:

based on determining that a received quality of the PRS is above a threshold, generate the indication information to indicate the PRS.

6. The first terminal device of claim 1, wherein the first terminal device is caused to transmit the indication information by:

based on determining that a positioning accuracy requirement of positioning of the first terminal device is not satisfied using one or more available PRS with associated location information, transmitting the indication information to the network device.

7. The first terminal device of claim 1, wherein the indication information comprises at least one of the following:

an identifier (ID) of the PRS,
an ID of the second terminal device,
a received quality of the PRS,
a number of anchor terminal devices available for absolute positioning of the first terminal device,
a positioning accuracy requirement of the positioning of the first terminal device,
an achieved accuracy performance of the positioning of the first terminal device, or
an ID of each anchor terminal device used in the absolute positioning of the first terminal device.

8. The first terminal device of claim 1, wherein the indication information is transmitted based on a long term evolution (LTE) positioning protocol (LPP) protocol.

9. A network device comprising:

at least one processor; and at least one memory storing instructions that, when executed by the at least one processor, cause the network device at least to:

receive, from a first terminal device, indication information for indicating a positioning reference signal (PRS) transmitted by a second terminal device without location information of the second terminal device;

determine whether to trigger the second terminal device to transmit the location information of the second terminal device along with a subsequent PRS; and based on determining to trigger the second terminal device, transmit, to the second terminal device, trigger information for triggering the second terminal device to transmit the location information along with the subsequent PRS for the first terminal device to receive the subsequent PRS and the location information, and determine an absolute position of the first terminal device based on the subsequent PRS and the location information.

10. The network device of claim 9, wherein the network device is further caused to:

based on determining to trigger the second terminal device, transmit, to the first terminal device, notification information that the network device has triggered the second terminal device to transmit the location information along with the subsequent PRS.

11. The network device of claim 10, wherein the notification information further comprises assistance information for the first terminal device to receive the location information from the second terminal device.

12. The network device of claim 9, wherein the indication information indicates a plurality of PRS including the PRS transmitted by the second terminal device, and the network device is caused to determine whether to trigger the second terminal device by:

determining to trigger a plurality of terminal devices transmitting the plurality of PRS to transmit location information of the plurality of terminal devices along with a subsequent plurality of PRS, wherein the second terminal device is one of the plurality of terminal devices.

13. The network device of claim 9, wherein the indication information indicating a plurality of PRS including the PRS transmitted by the second terminal device, and the network device is caused to determine whether to trigger the second terminal device by:

determining a set of terminal devices among a plurality of terminal devices transmitting the plurality of PRS; and determining to trigger the set of terminal devices to transmit location information of the set of terminal devices along with a subsequent set of PRS, wherein the second terminal device is one of the set of terminal devices.

14. The network device of claim 13, wherein at least one of the following:

a set of PRS transmitted by the set of terminal devices have a received quality at the first terminal device above a threshold;

the set of terminal devices enables improvement of a geometric dilution of precision (GDOP) performance at the first terminal device; or the set of terminal devices have available location information.

15. The network device of claim 9, wherein the network device is caused to determine whether to trigger the second terminal device by:

based on determining, from the indication information, that a positioning accuracy requirement of positioning of the first terminal device is not satisfied, determining to trigger the second terminal device.

16. The network device of claim 9, wherein the network device is caused to determine whether to trigger the second terminal device by:

based on determining, from the indication information, that a number of anchor terminal devices available for absolute positioning of the first terminal device is below a threshold, determining to trigger the second terminal device.

17. The network device of claim 9, wherein the indication information comprises at least one of the following:

an identifier (ID) of the PRS,
an ID of the second terminal device,
a received quality of the PRS, a number of anchor terminal devices available for absolute positioning of the first terminal device, a positioning accuracy requirement of the positioning of the first terminal device, an achieved accuracy performance of the positioning of the first terminal device, or an ID of each anchor terminal device used in the absolute positioning of the first terminal device.

18. A second terminal device comprising:

at least one processor; and at least one memory storing instructions that, when executed by the at least one processor, cause the second terminal device at least to:

transmit a positioning reference signal (PRS) without location information of the second terminal device;

receive, from a network device, trigger information for triggering the second terminal device to transmit the location information of the second terminal device along with a subsequent PRS; and based on receiving the trigger information, transmit the subsequent PRS along with the location information of the second terminal device for a first terminal device to receive the subsequent PRS and the location information, and determine an absolute position of the first terminal device based on the subsequent PRS and the location information.

19. The second terminal device of claim 18, wherein the second terminal device is further caused to:

prior to transmitting the location information, based on determining that the location information is unavailable at the second terminal device, initiate positioning of the second terminal device to obtain the location information of the second terminal device.

* * * * *